(12) United States Patent
Ganguly et al.

(10) Patent No.: US 12,130,864 B2
(45) Date of Patent: Oct. 29, 2024

(54) DISCRETE REPRESENTATION LEARNING

(71) Applicant: International Business Machines Corporation, Armonk, NY (US)

(72) Inventors: Debasis Ganguly, Dublin (IE); Martin Gleize, Dublin (IE); Ambrish Rawat, Dublin (IE); Yufang Hou, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 16/987,484

(22) Filed: Aug. 7, 2020

(65) Prior Publication Data

US 2022/0043859 A1   Feb. 10, 2022

(51) Int. Cl.
   *G06N 20/00*   (2019.01)
   *G06F 16/901*   (2019.01)
   *G06F 17/16*   (2006.01)
   *G06F 18/22*   (2023.01)

(52) U.S. Cl.
   CPC .......... *G06F 16/9024* (2019.01); *G06F 17/16* (2013.01); *G06F 18/22* (2023.01); *G06N 20/00* (2019.01)

(58) Field of Classification Search
   CPC .......... G06N 20/00; G06F 18/22; G06F 17/16
   See application file for complete search history.

(56) References Cited

U.S. PATENT DOCUMENTS

| | | |
|---|---|---|
| 8,370,338 B2 | 2/2013 | Gordo |
| 8,711,146 B1 * | 4/2014 | Miller ............... G06F 17/12 382/226 |
| 8,873,812 B2 | 10/2014 | Larius-Larrondo |
| 9,720,998 B2 | 8/2017 | Wang et al. |
| 10,013,477 B2 | 7/2018 | Ye et al. |
| 10,241,997 B1 | 3/2019 | Mikolov |
| 2009/0028433 A1 * | 1/2009 | Tolliver ............ G06V 10/7635 382/173 |
| 2011/0213784 A1 * | 9/2011 | Udupa ............... G06F 16/3347 707/E17.051 |
| 2016/0246863 A1 * | 8/2016 | Sexton .................. G06F 16/904 |

(Continued)

FOREIGN PATENT DOCUMENTS

WO    2019040173 A1    2/2019

OTHER PUBLICATIONS

Kandola et al., "Learning Semantic Similarity", 2002 (Year: 2002).*

(Continued)

*Primary Examiner* — Paulinho E Smith
(74) *Attorney, Agent, or Firm* — Randy Tejeda

(57) ABSTRACT

Methods, computer program products and/or systems are provided that perform the following operations: obtaining a collection of objects; constructing a weighted graph based on the collection of objections, wherein the weighted graph preserves neighborhood semantics of objects of the collection of objects; generating partitions of nodes in the weighted graph of a fixed maximum size utilizing combinatorial partitioning; generating a vector for each node based on the partitions of nodes in the weighted graph; determining vector representations for objects in this collection and eventually applying this vector representation of the objects to gain efficiency (e.g., in terms of computation time and memory requirements) for use in downstream tasks such as recommendation.

20 Claims, 7 Drawing Sheets

(56) References Cited

U.S. PATENT DOCUMENTS

2018/0341719 A1 11/2018 Bhatia
2019/0251184 A1 8/2019 Shan

OTHER PUBLICATIONS

Wang et al., "Community-Based Weighted Graph Model for Valence-Arousal Prediction of Affective Words", 2016 (Year: 2016).*

ACL 2019, "The 4th Workshop on Representation Learning for NLP (RepL4NLP-2019)", Proceedings of the Workshop, Aug. 2, 2019, Florence, Italy, 296 pages.

Authors et. al.: Disclosed Anonymously, "Machine Learning to Predict Advertisement Targeting Solutions", An IP.com Prior Art Database Technical Disclosure IP.com No. IPCOM000252091D, IP.com Electronic Publication Date: Dec. 15, 2017, 35 pages.

Authors et. al.: Disclosed Anonymously, "Recognizing Semantic Formatting Information in a Document", An IP.com Prior Art Database Technical Disclosure, IP.com No. IPCOM000251990D, IP.com Electronic Publication Date: Dec. 13, 2017, 35 pages.

Authors et. al.: Disclosed Anonymously, "Retrospective User Input Inference and Correction", An IP.com Prior Art Database Technical Disclosure, IP.com No. IPCOM000252365D, IP.com Electronic Publication Date: Jan. 5, 2018, 38 pages.

Rocktaschel, Tim, "Combining Representation Learning with Logic for Language Processing", Department of Computer Science, University College London, Dec. 27, 2017, 152 pages.

Tissier et al., "Near-lossless Binarization of Word Embeddings", arXiv:1803.09065v3 [cs.CL] Nov. 15, 2018, 8 pages.

* cited by examiner

DISCRETE REPRESENTATION LEARNING

BACKGROUND

The present disclosure relates generally to the field of representation learning, and more particularly to generating discrete (e.g., binary, etc.) vector representations of objects.

In general, representation learning involves learning representations of input data that can make it easier to perform tasks associated with the data, for example, classification, prediction, and/or the like.

SUMMARY

According to an aspect of the present invention, there is a computer-implemented method, computer program product and/or system that performs the following operations (not necessarily in the following order): obtaining a collection of objects; constructing a weighted graph based on the collection of objections, wherein the weighted graph preserves neighborhood semantics of objects of the collection of objects; generating partitions of nodes in the weighted graph of a fixed maximum size utilizing combinatorial partitioning; generating a discrete vector for each node based on the partitions of nodes in the weighted graph; determining discrete vector representations for objects in the collection of objects based on the discrete vectors; and providing the vector representations of the objects to gain efficiency (e.g., in terms of computation time and memory requirements) for use in downstream tasks such as recommendation.

DETAILED DESCRIPTION

Figure 1:
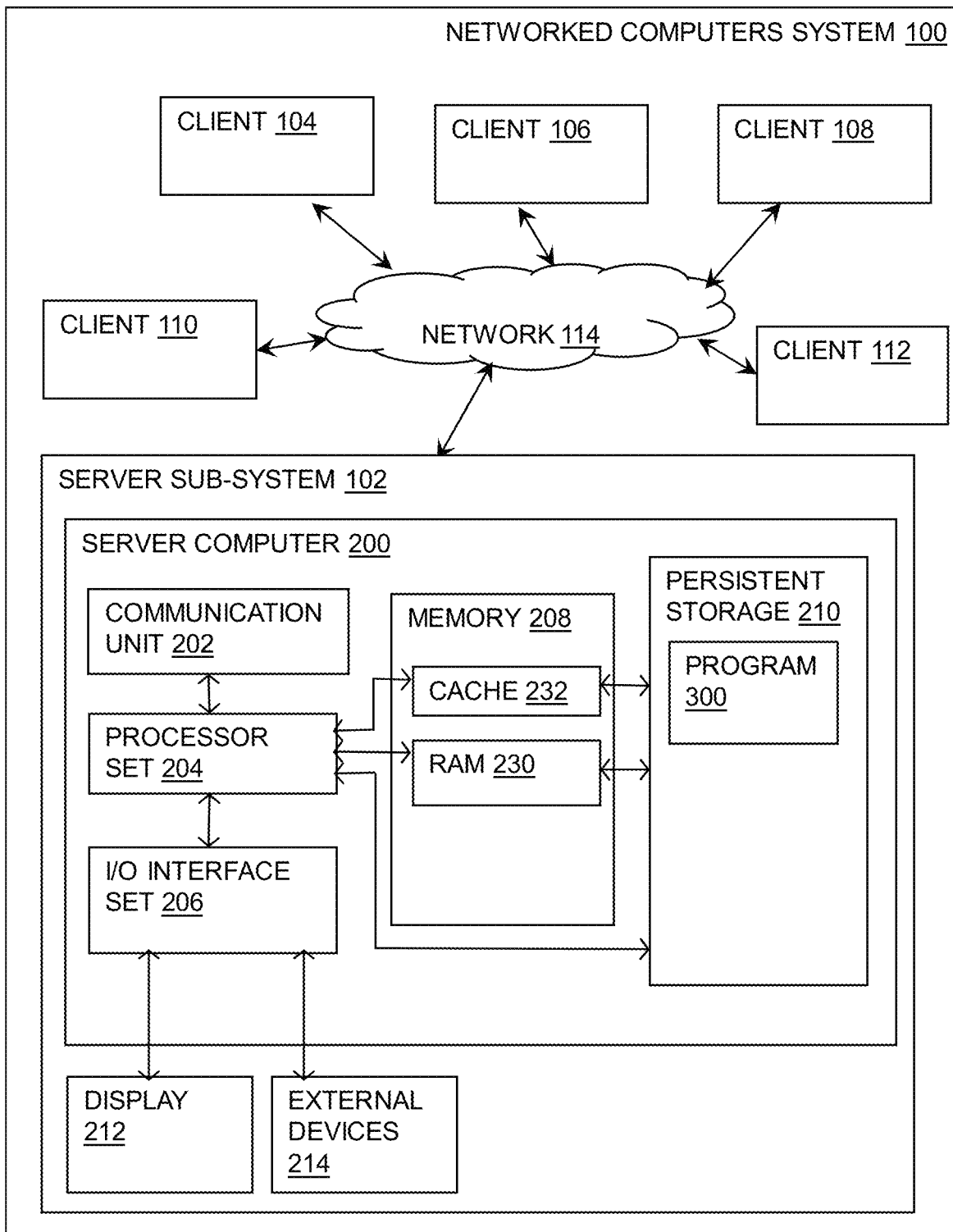
FIG. 1 is a block diagram view of a first embodiment of a system, according to the present disclosure.

According to aspects of the present disclosure, systems and methods can be provided to allow for discrete (e.g., binary) representation learning. For example, systems and methods according to the present disclosure may provide combinatorial approaches to word representation learning. In particular, systems and methods of the present disclosure can provide for generating discrete vector representations (e.g., binary vector representations, etc.) for objects (e.g., words, etc.) in an unlabeled collection of objects (e.g., text collection, etc.) using combinatorial optimization. In some embodiments, the systems and methods can provide the discrete vector representations (e.g., binary vector representations, etc.) as embeddings of each object in the collection (e.g., binary embeddings, etc.) which can used in indexing and/or searching and allow for using the embeddings to organize, retrieve, recommend, and/or the like semantically similar objects. In some embodiments, the systems and methods can be applied for representation learning, text processing, natural language processing, and/or the like.

As one example, some embodiments of the present disclosure can provide a combinatorial approach to word embedding which does not require a gradient descent approach. Some embodiments can provide for employing a discrete graph-based approach to represent the local co-occurrences of word pairs, and then partition the graph using heuristic-based graph partitioning to obtain approximately balanced partitions or cut-sets. Examples of such discrete heuristics-driven graph-partitioning approaches include InfoMAP, Kernighan-Lin (KL) algorithm, multilevel graph bisection, community detection algorithms, etc. In such embodiments, each partition can maximize the intra-similarity between its members and minimize inter-similarity with other words outside its set. Codes (e.g., binary codes, etc.) can then be assigned to each member of a partition by iterating over each partition.

This Detailed Description section provides the following sub-sections: The Hardware and Software Environment; Example Embodiment(s); Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of exemplary networked computers system 100, which may include: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that is used to create, manage and control certain software functions that will be discussed in detail, below, in the Example Embodiment sub-section of this Detailed Description section. As an example, a program 300 can comprise a binary embedder and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device(s) 208 and persistent storage device(s) 210 are computer-readable storage media. In general, memory device(s) 208 can include any suitable volatile or non-volatile computer-readable storage media. It is further noted that, now and/or in the near future: (i) external device set 214 may be able to supply, some or all, memory for sub-system 102; and/or (ii) devices external to sub-system 102 may be able to provide memory for sub-system 102.

Program 300 is stored in persistent storage device(s) 210 for access and/or execution by one or more of the respective computer processors in processor set 204, usually through one or more memories of memory device(s) 208. Persistent storage device(s) 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device(s) 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage device(s) 210 includes a magnetic hard disk drive. To name some possible variations, persistent storage device(s) 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage device(s) 210 may also be removable. For example, a removable hard drive may be used for persistent storage device(s) 210. Other examples include optical and magnetic disks, thumb drives, and smart cards that are inserted into a drive for transfer onto another computer-readable storage medium that is also part of persistent storage device(s) 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device device(s) 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiment(s)

Figure 2:
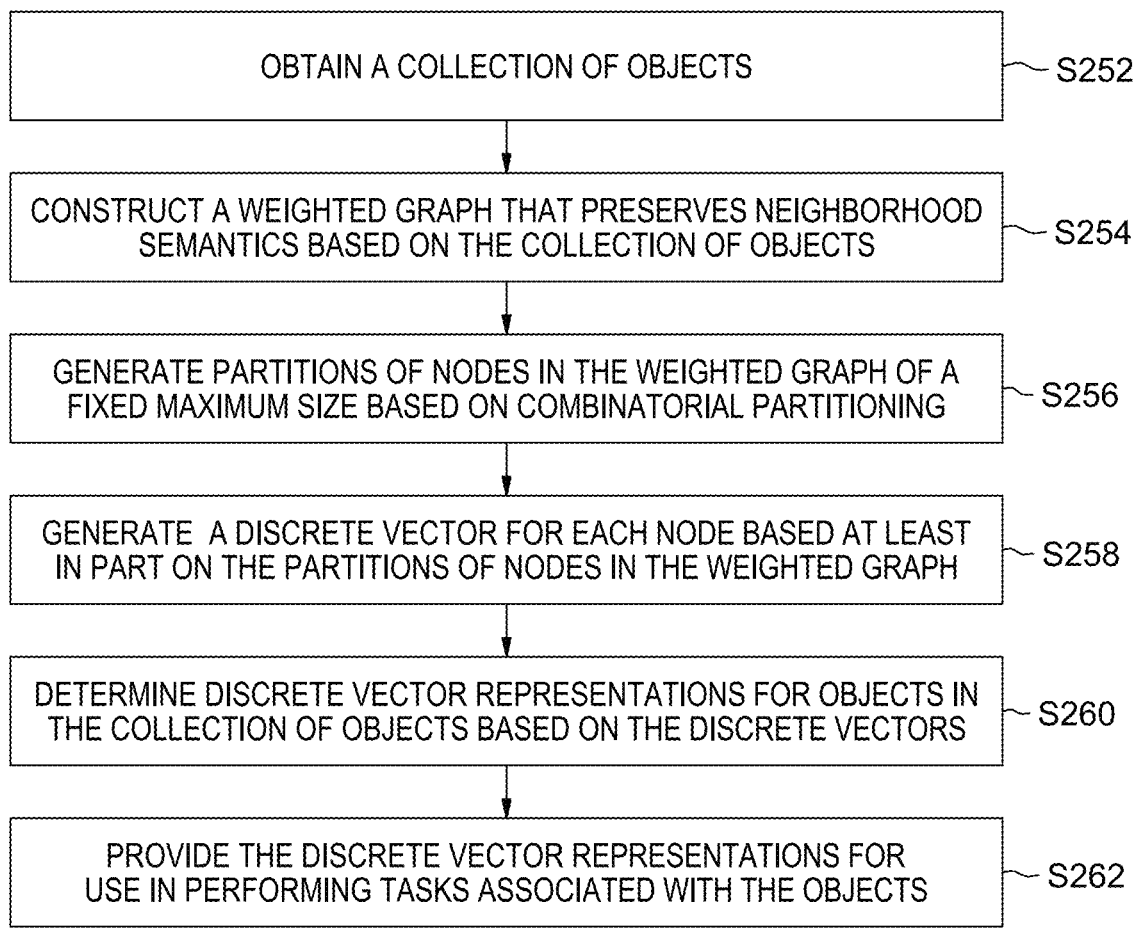
FIG. 2 is a flowchart showing a first embodiment method performed, at least in part, by the first embodiment system.

FIG. 2 shows flowchart 250 depicting a computer-implemented method according to the present invention.

As illustrated in FIG. 2, in some embodiments, operations for generating binary embeddings for a collection of objects begin at operation S252, where a computing system (e.g., server computer 200 of FIG. 1 or the like) obtains a collection of objects. For example, in some embodiments, the collection of objects may be an unlabeled or raw text collection with the objects being the words in the collection of text. As another example, the collection of objects may include files stored on a device, such as documents, songs, images, and/or the like, and the objects in the collection may include words in document(s), title and/or lyrics of song(s), tags associated with image(s), and/or the like. In some embodiments, the collection of objects may be provided along with information about the relations between objects, for example, the objects may be equipped with associated distance functions.

Processing proceeds to operation S254, where the computing system (e.g., server computer 200 of FIG. 1 or the like) constructs a weighted graph that preserves neighborhood semantics based on the collection of objects, for example, using a running window to process the objects in the collection (e.g., a moving window across object sequences). In some embodiments, the computing system can construct a weighted graph based on the objects in the collection and their distance functions. As an example, in some embodiments, following input of a collection of objects, such as a text collection, and the objects relations, a graph can be constructed based on the local co-occurrences of the objects (e.g., words, etc.). The graph can be constructed with weighted edges between the objects (e.g., words) with the weight denoting how correlated (e.g., measure of similarity) the two objects (e.g., words) are. For example, as illustrated in FIG. 4, graph diagram 400 illustrates a weighted graph (G) 402 that can be constructed based on a collection of objects (e.g., a collection of words, etc.) with weighted edges, such as edges 406a, etc., between the objects (e.g., words, etc.), such as object 404a, object 404b, etc.

Processing proceeds to operation S256, where the computing system (e.g., server computer 200 of FIG. 1 or the like) generates partitions of nodes in the weighted graph, with the partitions being of a fixed maximum size, based on combinatorial partitioning. In some embodiments, combinatorial graph partitioning approaches, such as multilevel graph partitioning, a community detection algorithm (e.g., InfoMAP, label propagation, etc.), and/or the like, can be applied to the weighted graph to partition the objects represented in the weighted graph.

Figure 4:
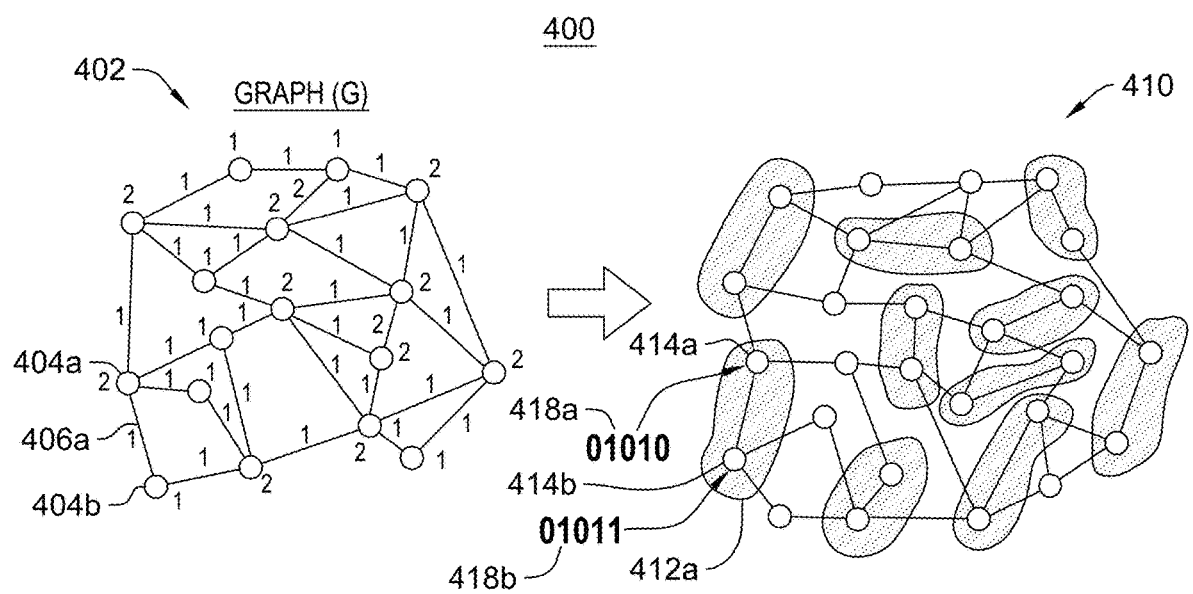
FIG. 4 is a diagram illustrating an example of combinatorial graph partitioning, in accordance with embodiments of the present disclosure.

As an example, in some embodiments, following construction of the weighted graph (e.g., weighted graph (G) 402 of FIG. 4), the weighted graph can be partitioned by applying combinatorial graph partitioning to generate a partitioned graph, such as partitioned graph 410 illustrated in graph diagram 400 of FIG. 4. For example, as illustrated in FIG. 4, weighted graph (G) 402 can be partitioned to obtain partitioned graph 410 with approximately balanced partitions, such as partition ($P_1$) 412a, etc. Each partition, such as partition 412a, can maximize the intra-similarity between its member objects, such as object 414a and object 414b, and minimize inter-similarity with other objects outside its object set.

Processing proceeds to operation S258, where the computing system (e.g., server computer 200 of FIG. 1 or the like) generates a discrete vector (e.g., binary vector, etc.) for each node (e.g., object) of the graph based at least in part on the partitions of nodes in the weighted graph. In some embodiments, the discrete vector (e.g., binary vector, etc.) for each node can be generated such that the distance between two nodes in a partition is preserved as a notion of distance between their corresponding vectors. As an example, in some embodiments, for each partition Pi of a graph, a discrete vector (e.g., binary vector, etc.) can be generated, such as by choosing a vector in $\{0, 1\}^k$ in a manner similar to K-means++ centroid initialization. For example, in some embodiments, a first centroid can be chosen at random and then the second centroid can be chosen to that it is likely to be distant from the first centroid, and so on.

Processing proceeds to operation S260, where the computing system (e.g., server computer 200 of FIG. 1 or the like) determines discrete vector representations (e.g., binary vector representations, etc.) for objects in the collection of objects based on the discrete vectors (e.g., binary vectors, etc.) for each node of the graph. For example, in some embodiments, discrete vector representations (e.g., codes such as binary codes, etc.) can then be assigned to each member (e.g., object) of a partition by iterating over each partition in the graph. In some embodiments, as illustrated in FIG. 4 for example, a discrete vector representation 418a (01010) can be generated for node (e.g., object) 414a and a discrete vector representation 418b (01011) can be generated for node (e.g., object) 414b.

In an example, in some embodiments, for each centroid $c_i$ of a partition $P_i$ of a graph, unallocated codes (e.g., in $\{0, 1\}^k$) that are near the code of $c_i$ (the notion of distance could correspond to the number of differences in bits) can be chosen to assign discrete vector representations (e.g., binary vector representations, etc.) for the objects. The distance between the codes assigned are inversely proportional to the graph edge weights (e.g., measure of similarity). Additionally, no parametric learning (e.g., parameter updates by gradient descent) is involved.

Processing proceeds to operation S262, where the computing system (e.g., server computer 200 of FIG. 1 or the like) provides the discrete vector representations (e.g., binary vector representations, etc.), for example, to be used in performing tasks associated with the objects. As an example, in some embodiments, the discrete vector representations (e.g., binary vector representations, etc.) can be used to organize, retrieve, recommend, and/or the like semantically similar objects.

Figure 3A:
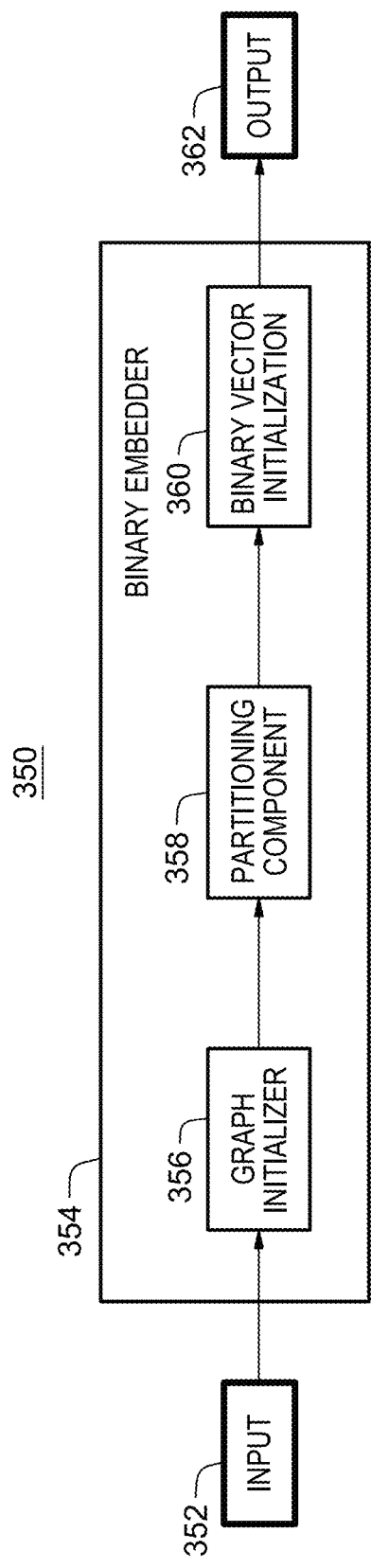
FIG. 3A is a block diagram showing a machine logic (for example, software) portion of the first embodiment system.
Figure 3B:
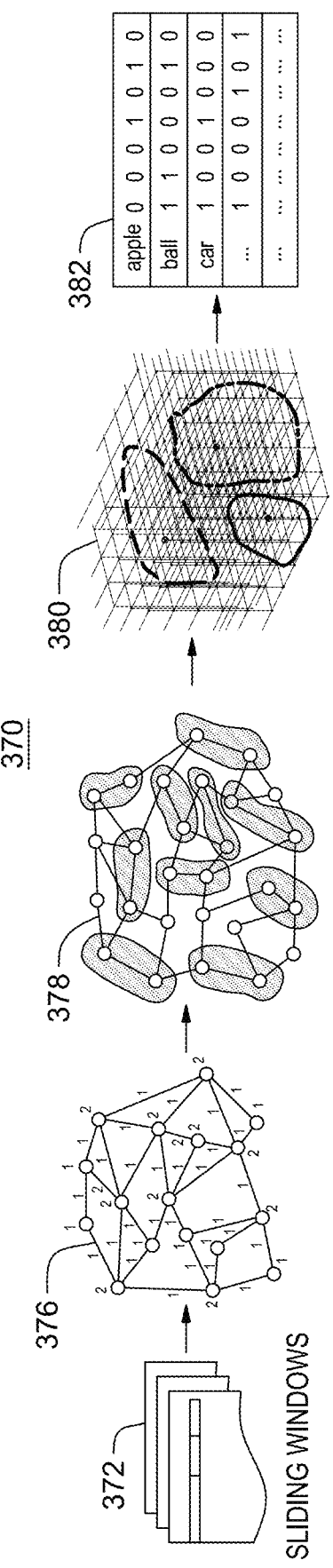
FIG. 3B is a schematic diagram illustrating some example intermediary and provided results of an embodiment method, in accordance with embodiments of the present disclosure.

FIG. 3A illustrates a block diagram 350 showing machine logic of an example embodiment according to the present disclosure and FIG. 3B illustrates a schematic diagram 370 of example intermediary steps and provided results in accordance with embodiments of the present disclosure. As illustrated in FIG. 3A, in some embodiments, operations described herein may be performed by a binary embedder 354 which includes a graph initializer 356, a partitioning component 358, and a binary vector initializer 360. As described with regard to FIG. 2 above, a computing system can obtain input 352 of a collection of objects, for example, collecting of all words in a corpus 372 as illustrated in FIG. 3B, and can provide the input 352 to a graph initializer 356 of the binary embedder 354.

The graph initializer 356 can construct a weighted graph (e.g., weighted graph 376), for example, using a running window over the input 352 (e.g., corpus 372), where the weighted graph preserves neighborhood semantics of the collection of objects in the input 352. The weighted graph 376 can be constructed with weighted edges between the objects (e.g., in corpus 372) with the weight denoting how correlated (e.g., measure of similarity) are two objects. The graph initializer 356 can provide the weighted graph to a partitioning component 358.

The partitioning component 358 can apply graph partitioning to the weighted graph (e.g., weighted graph 376) to partition the nodes within the graph, resulting in a partitioned graph 378, for example. For example, the partitioning component 358 can apply combinatorial graph partitioning and generate partitions of a fixed maximum size resulting in approximately balanced partitions. Each partition can be generated to maximize the intra-similarity between its member objects and minimize inter-similarity with other objects outside its object set.

The binary vector initializer 360 can initialize discrete vectors (e.g., binary vectors) for the nodes, such as node vectors 380, based on the partitions of the graph (e.g., graph 378), where the binary vectors preserve the distance between nodes. The binary embedder 354 can provide output 362 which includes discrete vector representations (e.g., binary vector representations, etc.) of the objects in the input 352. For example, the binary embedder 354 can provide output such as binary embeddings 382 for the vocabulary included in the corpus 372.

Further Comments and/or Embodiments

In general, standard embedding methods (e.g., word/node, etc.) obtain real-valued vectors using 8 bytes or 1 object (e.g., word/node) per component. Thus, storing a 100-dimensional real vector requires 100 words of memory. According to aspects of the present disclosure, in some embodiments, the systems and methods can obtain binary vectors using 1 bit per component. Thus, storing a 1024-dimensional binary vector would use 1024/64 or 16 words of memory. As such in some embodiments, systems and methods of the present disclosure can save storage space. Additionally, searching nearest neighbors is generally faster for binary vectors, as the distance metric is discrete (e.g., possible values of 0, 1, . . . k−1 for a k-bit encoding).

Figure 5:
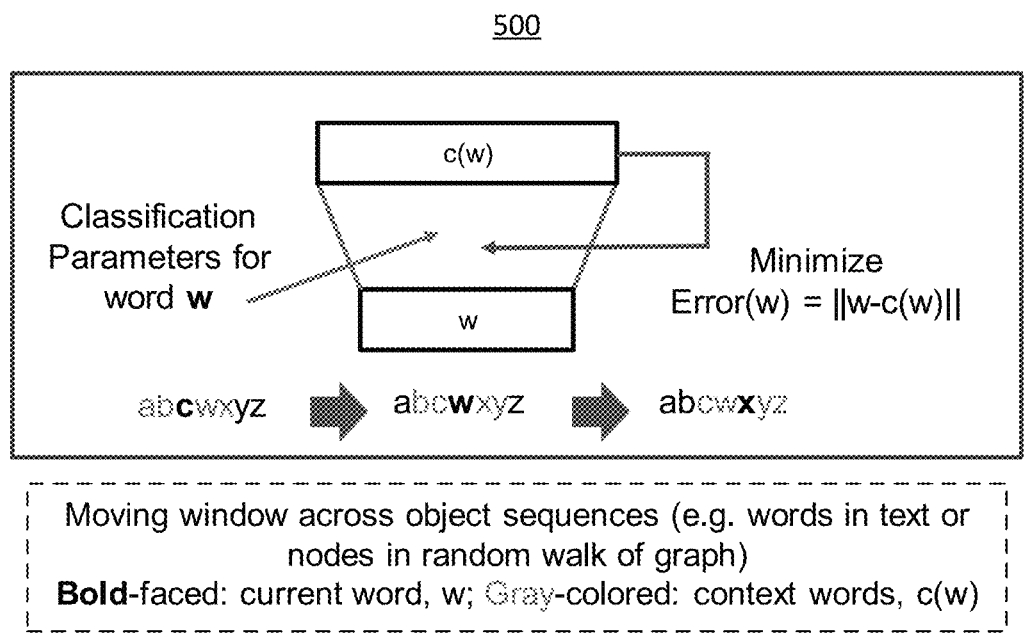
FIG. 5 is a diagram illustrating noise contrastive estimation for representation learning.

Generally, using noise contrastive estimation for representation learning, such as skip-gram for example, as illustrated by noise contrastive estimation diagram 500 of FIG. 5, learns to distinguish positive examples from negative examples and learns a global linear transformation matrix to pull the pairs of positive examples together and push the negative examples apart. Such noise contrastive estimation uses a loss function of sigmoid(w.c(w))+sigmoid(w.c'(w)) with w and c(w) being updated by gradient descent. The parameters for classification are learned by back propagating the error gradients and the set of parameters learned for word w becomes its dense vector representation (e.g., embedding). In such noise contrastive estimation, gradient descent generally works in an unconstrained way, as the component values are not discrete. Noise contrastive estimation would generally take time to learn the parameters (e.g., floating point) with back propagation. Additionally, noise contrastive estimation uses more storage space with slow loading of vectors and would take more time to find nearest neighbors.

Figure 6:
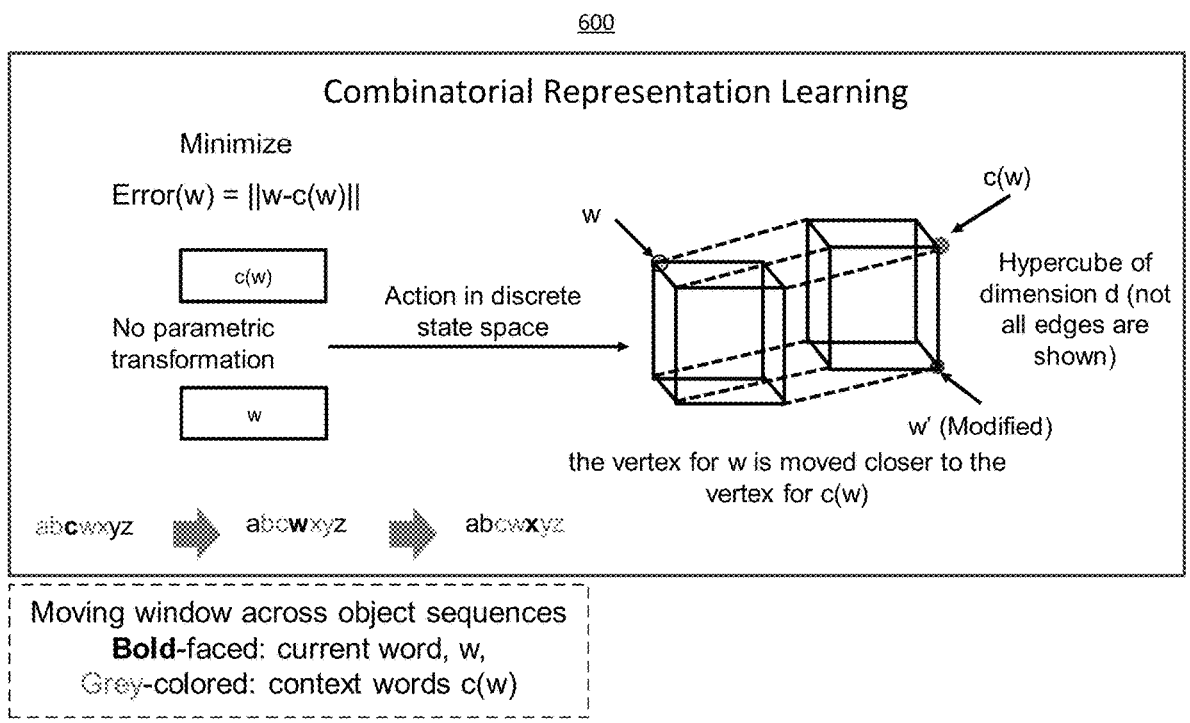
FIG. 6 is a diagram illustrating combinatorial representation learning, in accordance with embodiments of the present disclosure.

Embodiments of the present disclosure can provide for combinatorial representation learning, such as illustrated by combinatorial representation learning diagram 600 of FIG. 6 for example. In some embodiments, combinatorial representation learning has no parametric learning. Embodiments treat representation learning as a combinatorial optimization problem, providing for searching a discrete state space. In such embodiments, at each step, a state transition occurs to reduce the global objective.

In some embodiments, the systems and methods of the present disclosure can, for example, provide representation learning of objects under parsimonious settings of space (e.g., memory) and time (e.g., real-time). These object representations may be used, for example, in a proactive recommendation agent of a device (e.g., mobile device, etc.). As an example, the binary vectors generated can be used to organize, retrieve, and/or recommend semantically similar objects under parsimonious settings of memory and computation cycles, such as a mobile device proactive agent that tags stored files (e.g., music, text, etc.) as per text semantics or usage patterns and allows fast semantic querying.

Figure 7:
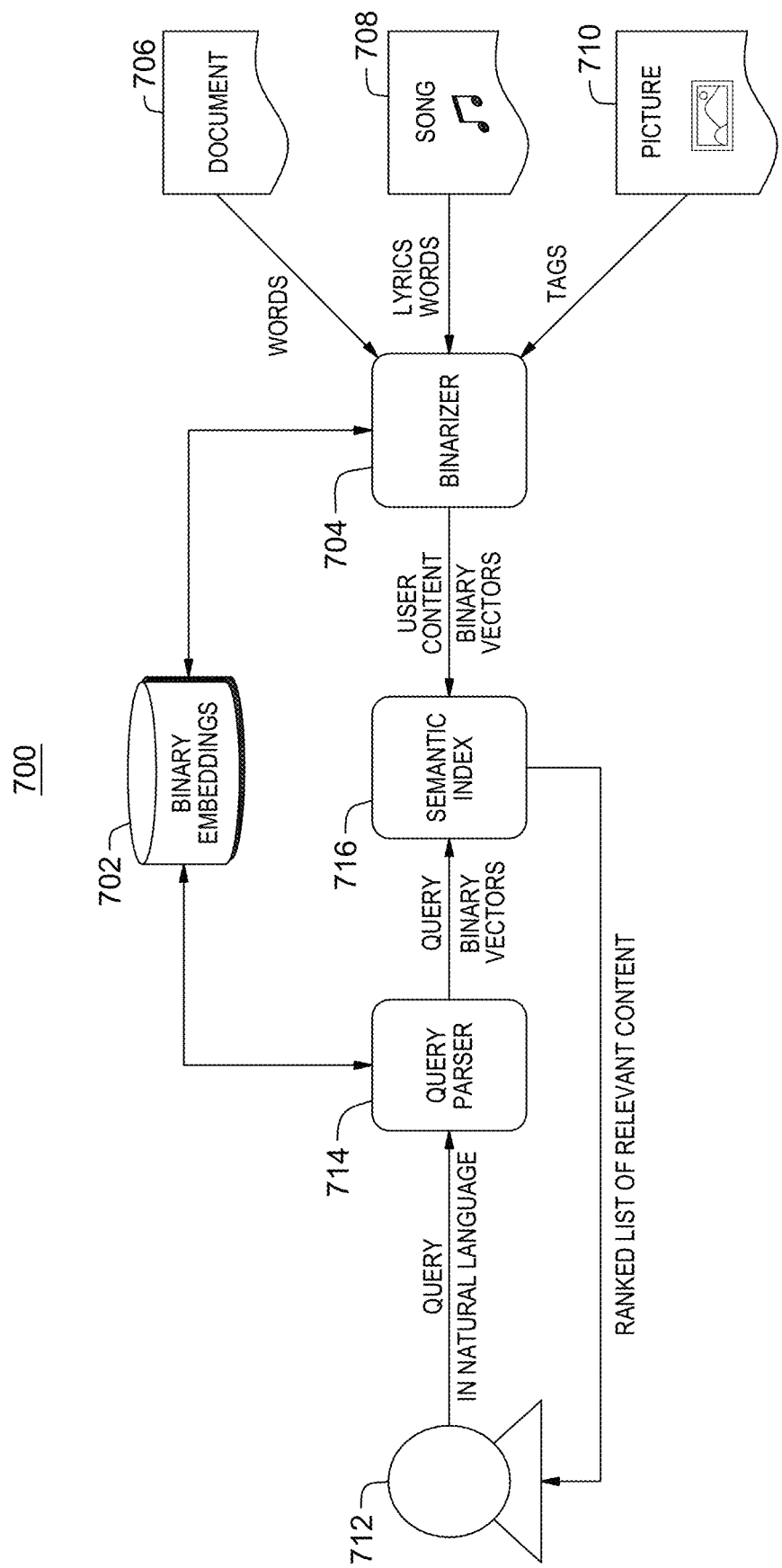
FIG. 7 is a block diagram of an example embodiment of a system using binary embeddings, in accordance with embodiments of the present disclosure.

For example, FIG. 7 illustrates a block diagram of an example embodiment system 700 of on-device document semantic indexing using binary embeddings in accordance with embodiments of the present disclosure. The on-device document semantic indexing can provide an index and/or search engine for documents, songs, images, and/or the like on a device (e.g., mobile device, phone, tablet, etc.). Such on-device document semantic indexing can allow for operation on a device without reliance on a network. In some embodiments, on-device document semantic indexing can provide for searching semantically related words such that a user does not have to remember the exact wording of a document, the exact lyrics of a song, etc. In some embodiments, the binary embeddings of all the words can be used to build an inverted index of content on a device which can be done prior to any searching. The binary embeddings can allow for using fast k-nearest neighbor (k-NN) approaches to find closely related words, hence allowing for finding closely related content.

As illustrated in FIG. 7, a system 700 for on-device document semantic indexing using binary embeddings can include binary embeddings 702, binarizer 704, semantic index 716, and query parser 714. The binary embeddings 702 can be generated as described herein and stored on a device. In some embodiments, the binary embeddings 702 can be trained on a large collection of textual content.

The binarizer 704 can take all the indexable content on the device as input, such a document 706 and all its words, a song 708 and its name and lyrics, a picture 710 and its tags, and/or the like. The binarizer 704 can use the binary embeddings 702 to generate associations of the content with the binary vectors of its words.

The query parser 714 can takes a query in natural language from the user 712, for example, and use the binary embeddings 702 to turn the words of the query into corresponding binary vectors.

At indexing time, the semantic index 716 can take as input the associations of <content, binary vectors> provided by the binarizer 704 and build an inverted index that can map a unique vector to relevant content and/or multiple pieces of relevant content. In some embodiments, the semantic index 716 may possibly index n-grams of words, for example, combining their vectors into one with simple operators such as majority vote, or, and, etc.

At query time, the semantic index 716 can take as input the binary vectors corresponding to the words of the query (possibly combining into one) and look up the binary vectors in the inverted index. The semantic index 716 can retrieve the most relevant content and return a ranked list to the user 712. Using fast k-NN approaches can make this process both time and memory efficient.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   obtaining a collection of objects, wherein the collection of objects include files stored on one or more devices;
   constructing a weighted graph based on the collection of objects, wherein the weighted graph preserves neighborhood semantics of objects of the collection of objects;
   generating partitions of nodes in the weighted graph of a fixed maximum size utilizing combinatorial partitioning;
   generating a binary vector for each node in the weighted graph based on the partitions of nodes, wherein each binary vector is generated based on randomly choosing a first centroid associated with the partitions of nodes and choosing a second centroid associated with the partition of nodes that is likely to be most distant from the first centroid;
   determining binary vector representations for objects in the collection of objects based on the binary vector corresponding to each node; and
   providing the binary vector representations to the one or more devices for use in performing tasks associated with the files stored on the one or more devices by the one or more devices, wherein in response to providing the binary vector representations, the one or more devices are caused to perform on-device document semantic indexing that provides an index and search engine for the files stored on the one or more devices, to allow for operation on a device without reliance on a network, and to provide for searching of semantically-related words such that a user need not have to remember an exact wording associated with the data stored on the device.

2. The computer-implemented method of claim 1, wherein the objects in the collection of objects have associated distance functions.

3. The computer-implemented method of claim 1, wherein constructing the weighted graph based on the collection of objects is further based on the associated distance functions of the objects of the collection of objects.

4. The computer-implemented method of claim 1, wherein the binary vector for each node is generated such that a distance between two nodes in a partition preserves the distance between binary vectors corresponding to the two nodes.

5. The computer-implemented method of claim 1, wherein the collection of objects comprises words in a raw collection of text.

6. The computer-implemented method of claim 5, wherein the weighted graph is constructed based on local co-occurrences of word pairs and comprises weighted edges between words.

7. The computer-implemented method of claim 6, wherein a weight of an edge is representative of a measure of similarity between two words.

8. A computer program product comprising:
   one or more computer-readable storage devices; and
   program instructions stored on at least one of the one or more computer-readable storage devices, the program instructions configured to cause one or more computer processors to:
      obtain a collection of objects, wherein the collection of objects include files stored on one or more devices;
      construct a weighted graph based on the collection of objects, wherein the weighted graph preserves neighborhood semantics of objects of the collection of objects;
      generate partitions of nodes in the weighted graph utilizing combinatorial partitioning, the partitions being of a fixed maximum size;
      generate a binary vector for each node based on the partitions of nodes in the weighted graph, wherein each binary vector is generated based on randomly choosing a first centroid associated with the partitions of nodes and choosing a second centroid associated with the partition of nodes that is likely to be most distant from the first centroid;
      determine binary vector representations for objects in the collection of objects based on the binary vector corresponding to each node; and
      provide the binary vector representations to the one or more devices for use in performing tasks associated with the files stored on the one or more devices by the one or more devices, wherein in response to providing the binary vector representations, the one or more devices are caused to perform on-device document semantic indexing that provides an index and search engine for the files stored on the one or more devices, to allow for operation on a device without reliance on a network, and to provide for searching of semantically-related words such that a user need not have to remember an exact wording associated with the data stored on the device.

9. The computer program product of claim 8, wherein the objects in the collection of objects have associated distance functions.

10. The computer program product of claim 8, wherein constructing the weighted graph based on the collection of objects is further based on the associated distance functions of the objects of the collection of objects.

11. The computer program product of claim 8, wherein the binary vector for each node is generated such that a distance between two nodes in a partition preserves the distance between binary vectors corresponding to the two nodes.

12. The computer program product of claim 8, wherein the collection of objects comprises words in a raw collection of text.

13. The computer program product of claim 12, wherein the weighted graph is constructed based on local co-occurrences of word pairs and comprises weighted edges between words.

14. The computer program product of claim 13, wherein a weight of an edge is representative of a measure of similarity between two words.

15. A computer system comprising:
a processor(s) set; and
a computer readable storage medium;
wherein:
the processor set is structured, located, connected or programmed to run program instructions stored on the computer readable storage medium; and
the stored program instructions include:
program instructions programmed to obtain a collection of objects, wherein the collection of objects include files stored on one or more devices;
program instructions programmed to construct a weighted graph based on the collection of objects, wherein the weighted graph preserves neighborhood semantics of objects of the collection of objects;
program instructions programmed to generate partitions of nodes in the weighted graph of a fixed maximum size utilizing combinatorial partitioning;
program instructions programmed to generate a binary vector for each node based on the partitions of nodes in the weighted graph, wherein each binary vector is generated based on randomly choosing a first centroid associated with the partitions of nodes and choosing a second centroid associated with the partition of nodes that is likely to be most distant from the first centroid;
program instructions programmed to determine binary vector representations for objects in the collection of objects based on the binary vector corresponding to each node; and
program instructions programmed to provide the binary vector representations to the one or more devices for use in performing tasks associated with files stored on the one or more devices by the one or more devices, wherein in response to providing the binary vector representations, the one or more devices are caused to perform on-device document semantic indexing that provides an index and search engine for the files stored on the one or more devices, to allow for operation on a device without reliance on a network, and to provide for searching of semantically-related words such that a user need not have to remember an exact wording associated with the data stored on the device.

16. The computer system of claim 15, wherein the objects in the collection of objects have associated distance functions.

17. The computer system of claim 15, wherein constructing the weighted graph based on the collection of objects is further based on the associated distance functions of the objects of the collection of objects.

18. The computer system of claim 15, wherein the binary vector for each node is generated such that a distance between two nodes in a partition preserves the distance between binary vectors corresponding to the two nodes.

19. The computer system of claim 15, wherein the collection of objects comprises words in a raw collection of text.

20. The computer system of claim 19, wherein the weighted graph is constructed based on local co-occurrences of word pairs and comprises weighted edges between words and wherein a weight of an edge is representative of a measure of similarity between two words.

* * * * *